Patented Oct. 7, 1941

2,258,414

UNITED STATES PATENT OFFICE

2,258,414
DENATURANT

Hamline M. Kvalnes, Wilmington, Del., assignor to E. I. du Pont de Nemours & Company, Wilmington, Del., a corporation of Delaware No Drawing. Application July 20, 1940, Serial No. 346,521

3 Claims. (Cl. 252—366)

This invention relates to denaturants and more particularly to denatured alcohols and the method of denaturing them.

Many proposals have been made in the past for the use of various substances which, when mixed with a material such as an alcohol completely changes its taste and odor so that it cannot be diverted from its intended use. For example, this procedure has been applied to methanol to avoid its being taken internally, as well as to ethanol and other alcohols which might otherwise be diverted from their intended commercial use to that of a beverage.

Materials which have been proposed as denaturants before have had one or more characteristics which adapt them for denaturing purposes. There are, however, several specific features which it is desirable to have in a denaturant and all of which have not been possessed to a sufficient degree by the denaturants previously suggested. Thus, for example, it is desirable that a denaturant have an obnoxious taste and a distinctive odor. Substances have been proposed previously which possess disagreeable tastes but the odor carried by the denaturant has often been of such a character as to make the final denatured alcohol commercially undesirable.

Another characteristic which a denaturant must possess is that of difficulty of removal from the denatured medium. As rapidly as denaturants have been proposed, methods have been discovered for their removal from the denatured medium. The methods utilized for removal of denaturants have been usually chemical treatment of the denatured medium combined with or followed by various distillation steps and further chemical treatment until, finally, relatively pure alcohol has been obtained.

It is an object of the present invention to overcome the disadvantages of the prior art and to provide a new and improved denaturant and denatured materials.

It is a further object of the present invention to provide a denatured ethyl alcohol which possesses a distinctive but unobjectionable odor, and a taste which renders the ethyl alcohol unpotable.

Other objects and advantages of the present invention will be apparent by reference to the following specification in which the preferred embodiments and details are set forth.

According to the present invention a denatured material from which it is extremely difficult if not impossible to remove the denaturant is prepared by mixing with a liquid material such as an alcohol, including methyl, ethyl, and like alcohols, relatively small quantities of methyl vinyl ketone.

The denaturant of this invention is generally applicable for treatment of any normally liquid material which it is desired to denature although, preferably, the material to be denatured should have a boiling point in the range of 60° C. to 150° C. From a material having a boiling point in this range it will be found extremely difficult, if not impossible, to remove my denaturant.

A wide range of alcohols may be successfully denatured or distinguished from one another according to this invention, such, for example, as methyl alcohol, ethyl alcohol, butyl alcohol, isobutyl alcohol, isopropyl alcohol, and others.

Methy vinyl ketone possesses a pungent odor and is unpotable because of odor and taste. Both the odor and the taste persist in spite of drastic treatment utilized for their removal.

The following example illustrates the proportions and manner in which my denaturant may be utilized. It will be noted that small quantities only of the denaturant are necessary for denaturing purposes and that the material remaining after treatment for denaturant removal possesses an undesirable taste and a distinctive odor. The proportions given are in parts by volume.

Example 1

160 cc. of denatured alcohol prepared by adding 0.5 part of methyl vinyl ketone to 100 parts of pure 95% ethanol is diluted with 480 cc. of saturated salt solution and 160 cc. of water. A clear solution is obtained. It is then shaken with 40 cc. of mineral oil for 3 minutes and allowed to stand overnight. The resulting alcoholic brine layer is then shaken for 3 minutes with a second portion (32 cc.) of mineral oil and allowed to stand 1 hour. The alcoholic brine layer from the second extraction is shaken with 8 g. of activated carbon for 5 minutes and filtered. The filtrate from the carbon treatment is then distilled at a reflux ratio of 10:1 and a drawoff rate of 1 cc. per minute using a fractionating column of approximately 15 theoretical plates. 128 cc. of distillate collects in 16 cc. cuts. Each cut diluted to 40% with water and rated as to odor and taste has the odor and taste of the denaturant and is unpotable.

Although not indicated in the example above given, the materials of the present invention may be utilized alone or may be admixed with other denaturing materials, such, for example, as sulfur-containing materials, wood oil products, and other known denaturing materials. It may be desirable, from time to time, to add other denaturing materials which possess stronger and more disagreeable odors than the denaturants of the present invention as a method of distinguishing the denatured alcohol utilized from other denatured alcohols or for other reasons. The material of the present invention is miscible, however, with anything, generally speaking, with which ethyl alcohol is miscible and may, therefore, be utilized in conjunction with other denaturing materials generally.

The proportions utilized according to the present invention may vary from an extremely small quantity, such as 0.05% up to 1.0% by volume or more of the alcohol, or material which is to be denatured, the amount of denaturant depending entirely upon the degree of odor and taste desired. Small quantities are, however, generally sufficient, i. e. in the range of 0.05 to 0.5% by volume. A great advantage of the present denaturant resides in the fact that it does not render the denatured material commercially and scientifically undesirable inasmuch as the character of the denatured material is not changed by the incorporation of my denaturant.

Various changes may be made in the present invention without departing therefrom or sacrificing any of the advantages thereof.

I claim:

1. A denatured alcohol containing as an essential denaturant, denaturing quantities of methyl vinyl ketone.

2. A denatured alcohol containing, as an essential denaturant, from 0.05 to 1.0% by volume of methyl vinyl ketone.

3. A denatured ethyl alcohol containing as an essential denaturant from 0.05 to 0.5% by volume of methyl vinyl ketone.

HAMLINE M. KVALNES.